(12) United States Patent
Dobbek et al.

(10) Patent No.: US 7,716,268 B2
(45) Date of Patent: May 11, 2010

(54) METHOD AND APPARATUS FOR PROVIDING A PROCESSOR BASED NESTED FORM POLYNOMIAL ENGINE

(75) Inventors: Jeffrey J. Dobbek, Morgan Hill, CA (US); Kirk Hwang, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1138 days.

(21) Appl. No.: 11/072,211

(22) Filed: Mar. 4, 2005

(65) Prior Publication Data

US 2006/0200732 A1   Sep. 7, 2006

(51) Int. Cl.
   G06F 7/38   (2006.01)
   G06F 1/02   (2006.01)
(52) U.S. Cl. ........................... 708/523; 708/270
(58) Field of Classification Search ................ 708/276, 708/440, 446, 552
   See application file for complete search history.

(56) References Cited

U.S. PATENT DOCUMENTS

| | | | | |
|---|---|---|---|---|
| 5,042,001 A | * | 8/1991 | Brightman et al. | 708/490 |
| 5,305,248 A | * | 4/1994 | Ammann | 708/502 |
| 5,422,805 A | * | 6/1995 | McIntyre et al. | 708/625 |
| 2003/0192005 A1 | * | 10/2003 | Williamson et al. | 714/758 |

* cited by examiner

Primary Examiner—Chuong D Ngo
(74) Attorney, Agent, or Firm—Merchant & Gould (57) ABSTRACT

A method and apparatus for providing a processor based nested form polynomial engine are disclosed. A concise instruction format is provided to significantly decrease memory required and allow for instruction pipelining without branch penalty using a nested form polynomial engine. The instruction causing a processor to set coefficient and data address pointers for evaluating a polynomial, to load loading a coefficient and data operand into a coefficient register and a data register, respectively, to multiply the contents of the coefficient register and data register to produce a product, to add a next coefficient operand to the product to produce a sum, to provide the sum to an accumulator and to repeat the loading, multiplying, adding and providing until evaluation of the polynomial is complete.

22 Claims, 5 Drawing Sheets

METHOD AND APPARATUS FOR PROVIDING A PROCESSOR BASED NESTED FORM POLYNOMIAL ENGINE

BACKGROUND OF THE INVENTION

1. Field of the Invention

This invention relates in general to digital signal processing, and more particularly to a method and apparatus for providing a processor based nested form polynomial engine.

2. Description of Related Art

A microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers.

In contrast, special-purpose microprocessors are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for evaluating polynomials include to a large degree repetitive operations such as multiply-and-add and multiple-bit-shift. DSPs can be specifically adapted for these repetitive functions, and provide a substantial performance improvement over general-purpose microprocessors in, for example, real-time applications such as image, speech, video and data processing.

DSPs are central to the operation of many of today's electronic products, such as high-density disk drives, digital cellular phones, complex audio and video equipment and automotive systems. The demands placed upon DSPs in these and other applications continue to grow as consumers seek increased performance from their digital products, and as the convergence of the communications, computer and consumer industries creates completely new digital products. In addition, digital systems designed on a single integrated circuit are referred to as an application specific integrated circuit (ASIC). Currently, the design of ASICs include complex digital systems implemented on a single chip, e.g. SRAMs, FIFOs, register files, RAMs, ROMs, universal asynchronous receiver-transmitters (UARTs), programmable logic arrays, field programmable gate arrays and other such logic circuits.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. For example, a DSP generally has a specialized multiply-accumulate (MAC) unit in order to improve the performance of repetitive digital signal processing algorithms. The increasing demands of technology and the marketplace make desirable even further structural and process improvements in processing devices, application systems and methods of operation and manufacture.

In algebra, a polynomial function, or polynomial for short, is a function of the form:

$$f(x) = a_n x^n + a_{n-1} x^{n-1} + \ldots + a_1 x + a_0,$$

where x is a scalar-valued variable, n is a nonnegative integer, and $a_0, \ldots, a_n$ are fixed scalars, called the coefficients of the polynomial f(x). Polynomial functions, or polynomials, are an important class of simple and smooth functions. Simple means they are constructed using only multiplication and addition. Smooth means they are infinitely differentiable, i.e., they have derivatives of all finite orders. Because of their simple structure polynomials are very easy to evaluate and are used extensively in numerical analysis for polynomial interpolation or to numerically integrate more complex functions.

In a polynomial as described above, the highest occurring power of x (n if the coefficient $a_n$ is not zero) is called the degree of f(x); its coefficient is called the leading coefficient. Where the leading coefficient is 1, we describe the polynomial as monic. $a_0$ is called the constant coefficient of f(x). Each summand of the polynomial of the form $a_k x^k$ is called a term. Here the variable x is, properly speaking, an indeterminate; it is on occasion replaced by something other than a scalar, e.g., some matrix or operator.

A root or zero of the polynomial f(x) is a number r such that f(r)=0. Determining the roots of polynomials, or "solving algebraic equations", is among the oldest problems in mathematics. Some polynomials, such as $f(x)=x^2+1$, do not have any roots among the real numbers.

Approximations for the real roots of a given polynomial can be found using Newton's method, or more efficiently using Laguerre's method, which employs complex arithmetic and can locate all complex roots. There is a difference between approximating roots and finding concrete closed formulas for them. Formulas for the roots of polynomials of degree up to 4 have been known since the sixteenth century. However, formulas for degree 5 polynomials are much difficult to obtain.

A digital signal processor (DSP) is a specialized microprocessor designed specifically for digital signal processing generally in real-time. DSPs can also be used to perform general-purpose computation, but they are not optimized for this function. Rather than general computations, DSPs usually have an instruction set (ISA) optimized for the task of rapid signal processing, such as the multiply-accumulate function.

An instruction set, or instruction set architecture (ISA), is a specification detailing the commands that a computer's CPU should be able to understand and execute, or the set of all commands implemented by a particular CPU design. The term describes the aspects of a computer or microprocessor typically visible to a programmer, including the native data types, instructions, registers, memory architecture, interrupt and fault system, and external I/O (if any). "Instruction set architecture" is sometimes used to distinguish this set of characteristics from the Micro-Architecture, which are the elements and techniques used to implement the ISA, e.g. microcode, pipelining, cache systems, etc.

The multiply-accumulate operation computes a product and adds it to an accumulator. In a CPU, an accumulator is a register in which intermediate results are stored. Without an accumulator, it would be necessary to write the result of each calculation (addition, multiplication, shift, etc.) to main memory and read them back. Access to main memory is slower than access to the accumulator, which usually has direct paths to and from the arithmetic logic unit (ALU). However, computing polynomials of single variables can be time consuming because of the number of cycles required and sizeable because of the number of bytes required to write code.

For example, consider the 3rd order polynomial $f(x)=ax^3+bx^2+cx^1+d$. To evaluate the polynomial, i.e., to solve for $f(x)=y$ for a given x. When using the monomial form of the polynomial, n additions and n2+n/2 multiplications are needed for the calculation of p(x). To increase the speed of evaluating the polynomial, the number of multiplications must be decreased because multiplications are slow and numerically instable compared to the additions. The Horner algorithm rearranges the polynomial into the recursive form $x(c+x(b+x(a)))+d$. This form is more suited to fast computation because there are no wasted stores of $x^2$ and $x^3$. For polynomials that could take on n orders there are two possibilities for writing this code. A hard coded form could be explicitly coded as follows:

$$y=(c_n*x+c_{n-1})^{16}, y=(y*x+c_{n2})^{16}, y=(y*x+c_{n3}), \ldots,$$
$$y=y*x+c_0.$$

However, such a code would get costly as the order grows.

The second possibility is to use the loop form. If in loop form, the code could be expressed in pseudo c as:

$$\text{for (int } i=n-1; y=c[n]x; i>=0; i--) \{y=(y*x+c[i])^{16}\}.$$

Still, this form is expensive in terms of cycles because i must be tested and a conditional branch back to the top of the loop must occur.

It can be seen then that there is a need for a method and apparatus for providing a processor based nested form polynomial engine.

SUMMARY OF THE INVENTION

To overcome the limitations in the prior art described above, and to overcome other limitations that will become apparent upon reading and understanding the present specification, the present invention discloses a method and apparatus for providing a processor based nested form polynomial engine.

The present invention solves the above-described problems by providing a concise instruction format to significantly decrease memory required and allow for instruction pipelining without branch penalty using a nested form polynomial engine.

A method for providing a processor based nested form polynomial engine in accordance with the principles of the present invention includes setting coefficient and data address pointers for evaluating a polynomial, loading a coefficient and data operand into a coefficient register and a data register, respectively, multiplying the contents of the coefficient register and data register to produce a product, adding a next coefficient operand to the product to produce a sum, providing the sum to an accumulator and repeating the loading, multiplying, adding and providing until evaluation of the polynomial is complete.

In another embodiment of the present invention, a processor based nested form polynomial engine is disclosed. The processor based nested form polynomial engine includes memory for providing a counter for calculating completion of a polynomial evaluation, a coefficient address pointers register for maintaining a coefficient address pointer and a data address pointers register for maintaining a data address pointer, a coefficient register and a data register, coupled to the memory, for loading a coefficient and data operand therein, respectively, a multiplier, coupled to the coefficient register and data register, for multiplying the contents of the coefficient register and data register to produce a product, an adder, coupled to the multiplier, for adding a next coefficient operand to the product to produce a sum, an accumulator, coupled to the adder, for accumulating the produced sum to produce an accumulated value and a state machine, coupled to the memory, for repeating the loading, multiplying, adding and accumulating until evaluation of the polynomial is complete.

In another embodiment of the present invention, a processor unit is disclosed. The processor unit includes memory for storing data and instructions therein and a processor configured for performing evaluation of a polynomial using a nested form, the processor being configured to set coefficient and data address pointers for evaluating a polynomial, to load a coefficient and data operand into a coefficient register and a data register, respectively, to multiply the contents of the coefficient register and data register to produce a product, to add a next coefficient operand to the product to produce a sum, to provide the sum to an accumulator and to repeat the loading, multiplying, adding and providing until evaluation of the polynomial is complete.

In another embodiment of the present invention, a data storage system is disclosed. The data storage system includes a translatable recording medium for storing data thereon, a motor for translating the recording medium, a transducer disposed proximate the recording medium for reading and writing data on the recording medium, an actuator, coupled to the transducer, for moving the transducer relative to the recording medium and a storage control device for controlling operation of the data storage system, the storage control device further including a storage controller for processing read and write signals and a processor unit, coupled to the storage controller, the processor unit performing evaluation of a polynomial using a nested form, the processor being configured to set coefficient and data address pointers for evaluating a polynomial, to load a coefficient and data operand into a coefficient register and a data register, respectively, to multiply the contents of the coefficient register and data register to produce a product, to add a next coefficient operand to the product to produce a sum, to provide the sum to an accumulator and to repeat the loading, multiplying, adding and providing until evaluation of the polynomial is complete.

In another embodiment of the present invention, another processor unit is disclosed. This processor unit includes means for storing data and instructions therein, means for setting coefficient and data address pointers for evaluating a polynomial, means for loading a coefficient and data operand into a coefficient register and a data register, respectively, means for multiplying the contents of the coefficient register and data register to produce a product, means for adding a next coefficient operand to the product to produce a sum, means for providing the sum to an accumulator, and means for repeating the loading, multiplying, adding and providing until evaluation of the polynomial is complete.

In another embodiment of the present invention, a polynomial instruction for controlling a processor based nested form polynomial engine for evaluating a polynomial is disclosed. The polynomial instruction includes a first field for designating whether to use absolute value of data, a second field for indicating that a result of a polynomial evaluation be stored in memory at a memory address, a third filed for providing the memory address for storing the result of the polynomial evaluation when directed, a fourth field for indicating an order of a polynomial to be evaluated, a fifth field for providing a coefficient address pointer and a sixth field for providing a data address pointer.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for providing a processor based nested form polynomial engine. A concise instruction format is provided to significantly decrease memory required and allow for instruction pipelining without branch penalty using a nested form polynomial engine.

Figure 1:
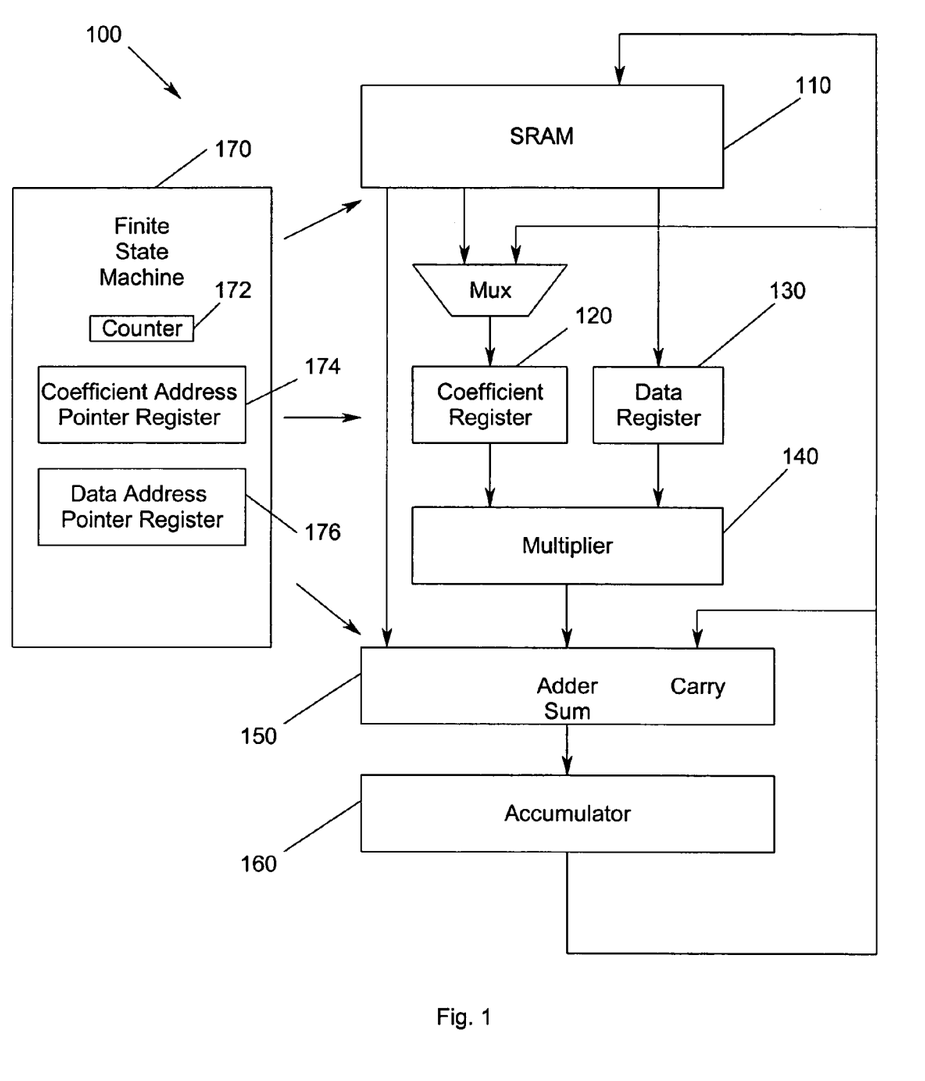
FIG. 1 illustrates a processor based nested form polynomial engine for evaluating fixed point polynomials according to an embodiment of the present invention.

FIG. 1 illustrates a processor based nested form polynomial engine 100 for evaluating fixed point polynomials according to an embodiment of the present invention. In FIG. 1, a memory 110 is provided for data storage. For example, a SRAM 100 can be used for the data storage. The SRAM 100 may be implemented as a unified SRAM, as two separate SRAMS, i.e., Coefficient SRAM and Data SRAM, for higher performance, or as a three port SRAM, i.e., two read ports and one write port. The coefficient and data can be either 16 bits or 32 bits wide depending on the application and the arithmetic resolution. A multiplier 140 multiplies the input from the coefficient register 120 and from the data register 130. The multiplier 140 may be, for example, implemented as a single cycle or as a multi-cycle pipeline multiplier for area/speed depending on the application. Furthermore, the multiplier 140 may be a 16×16, 32×16, or 32×32 multiplier.

Next, an adder 150 is provided to add the output of the multiplier 140 and output from the SRAM 110. The adder may be a 3:2 adder, i.e., three inputs and two outputs, and may include a single or a multi-cycle adder for area/speed depending on the application. An accumulator 160 receives the sum from the adder 150 and accumulates the sum therein. A finite state machine (FSM) 170 controls the dataflow. The finite state machine 170 includes a counter 172, a coefficient address pointer register 174 and a data address pointer register 176. The pointer registers 174, 176 have capability of pre/post increment or decrement.

To illustrate the operation of the processor based nested form polynomial engine, the following polynomial equation will be used:

$$y = ax^4 + bx^3 + cx^2 + dx + e.$$

In this example, the ADR register has the address 0x200, the coefficient pointer will have the address 0x000, and the data pointer will have the address 0x100. The content of the SRAM is as follows:

| Description | RAM contents Address | SRAM Contents |
|---|---|---|
| Coefficient pointer ==> | 0x000 | a |
|  | 0x002 | b |
|  | 0x004 | c |
|  | 0x006 | d |
|  | 0x008 | e |
| Data pointer ==> | 0x100 | x |
| Result ==> | 0x200 | y |

For illustration herein, two separate SRAMs are used for the coefficients and for the data, respectively. Based on the polynomial give above, the processor based nested form polynomial engine will use the one cycle multiplier:

$$Y = (((ax+b)x+c)x+d)x+e.$$

A concise instruction format is used to control the processor based nested form polynomial engine, wherein the concise instruction format significantly decreases the amount of memory required and allows for instruction pipelining without branch penalty.

Figure 2:
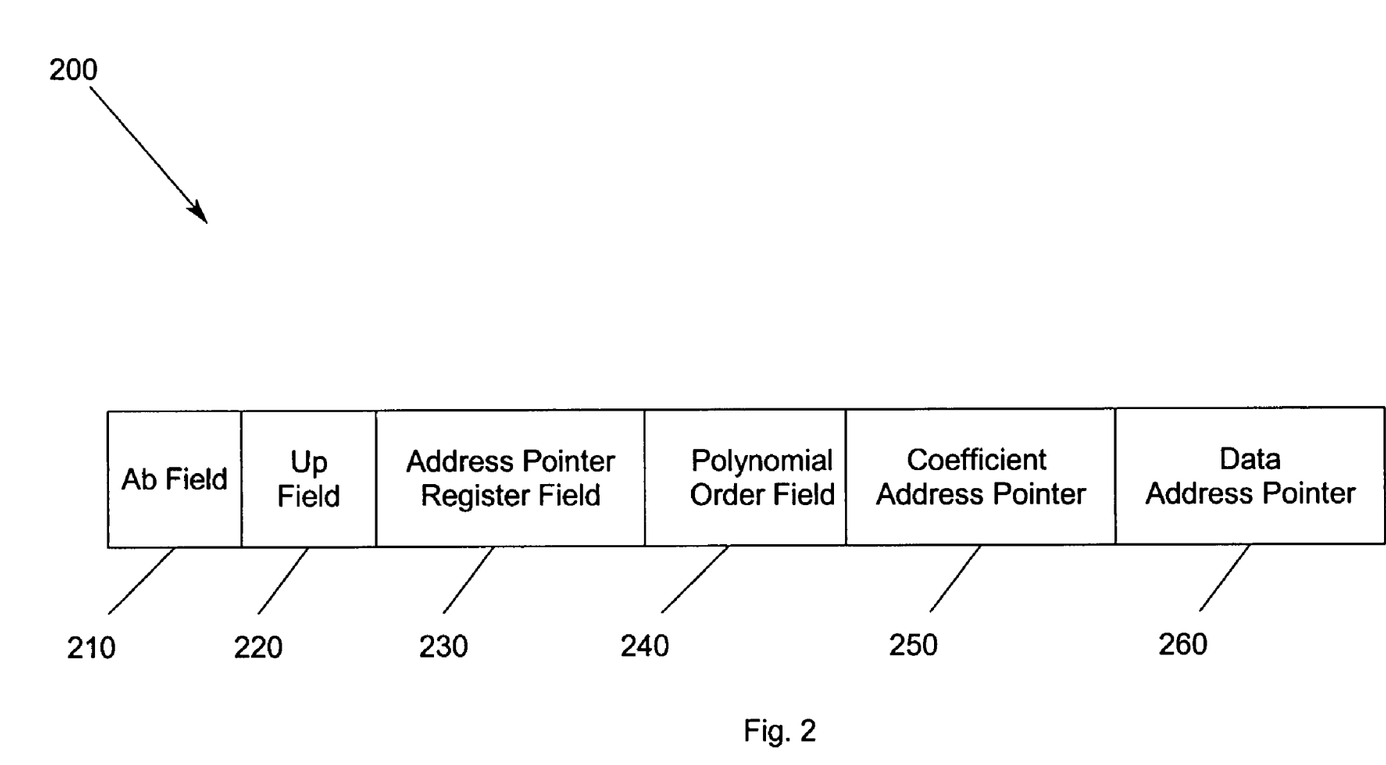
FIG. 2 illustrates the format for a polynomial instruction according to an embodiment of the present invention.

FIG. 2 illustrates the format for a polynomial instruction 200 according to an embodiment of the present invention. The polynomial instruction may be realized in a 32-bit instruction format. The results will be saturated to the max/maxmin value if the overflow/underflow is detected. The polynomial instruction 200 includes an Ab field 210, an Up field 220, an address pointer register field 230, a polynomial order field 240, a coefficient address pointer 250 and a data address pointer 260.

Possible variations for the instruction format illustrated in FIG. 2 are as follows:

| Instruction | Flags | Description |
|---|---|---|
| Poly | Ab = 0, Up = 0, | Evaluate nth order polynomial equation. When overflow/underflow are detected, the result is saturated to the max/max. |

-continued

| Instruction | Flags | Description |
| --- | --- | --- |
| Polyu | Ab = 0, Up = 0, | Evaluate nth order polynomial equation and store the result where specified by ADR register. When overflow/underflow are detected, the result is saturated to the max/max. |
| Polyabs | Ab = 1, Up = 0, | Evaluate nth order polynomial equation using the absolute value of data. When overflow/underflow are detected, the result is saturated to the max/min. The original sign of data is applied to the final result so that the sign of the final result and data are the same. |
| Polyabsu | Ab = 1, Up = 0, | Evaluate nth order polynomial equation using the absolute value of data and store the result where specified by ADR register. When overflow/underflow are detected, the result is saturated to the max/max. The original sign of data is applied to the final result so that the sign of the final result and data are same. |

If Ab is set, the absolute value of the data is used. If Up is set, the result is saved where the address is specified by the address pointer register.

Returning again to FIG. 1, the explanation of the operation of the processor based nested form polynomial engine will continue. In the first cycle, the counter 172 is set to the polynomial order. The coefficient pointer 174 is set to the coefficient address and the data pointer 176 is set to the data address. The coefficient and data operands are fetched. The sign is the most significant bit of the data.

In the second cycle, a is loaded into the coefficient register 120 and x, or |x| if Ab=1, is loaded into the data register 130. Coefficient b is fetched. The contents of the coefficient register 120 and the data register 130 are multiplied by the multiplier and the product is added to coefficient b, which was fetched. If the overflow/underflow is detected, the accumulator 160 is saturated to either the maximum or minimum value depending upon which is determined to be appropriate.

In the third cycle, the upper most significant 16 bits of the accumulator 160 is loaded into the coefficient register 120. The data register 130 is loaded with x. Coefficient c is fetched. The contents of the coefficient register 120 and the data register 130 are multiplied by the multiplier and the product is added to coefficient c, which was fetched. The sum is provided to the accumulator 160. Again, if the overflow/underflow is detected, the accumulator is saturated to either the maximum or minimum value depending upon which is determined to be appropriate.

In the fourth cycle, the upper most significant 16 bits of the accumulator 160 is loaded into the coefficient register 120. The data register 130 is loaded with x. Coefficient d is fetched. The contents of the coefficient register 120 and the data register 130 are multiplied by the multiplier and the product is added to coefficient d, which was fetched. The sum is provided to the accumulator 160. Again, if the overflow/underflow is detected, the accumulator is saturated to either the maximum or minimum value depending upon which is determined to be appropriate.

In the fifth cycle, the upper most significant 16 bits of the accumulator 160 is loaded into the coefficient register 120. The data register 130 is loaded with x. Coefficient e is fetched. The contents of the coefficient register 120 and the data register 130 are multiplied by the multiplier and the product is added to coefficient e, which was fetched. The sum is provided to the accumulator 160. Again, if the overflow/underflow is detected, the accumulator is saturated to either the maximum or minimum value depending upon which is determined to be appropriate.

In the sixth cycle, if Ab is set to 1, the two's compliment of the contents of the accumulator 160 is provided if the sign of the data was negative. If Up is set to 1, the contents of the accumulator 160 are stored in the SRAM at an address specified by the address pointer register 178.

Thus, the processor based nested form polynomial engine 100 according to an embodiment of the present invention evaluates fixed-point polynomials by using the nested loop form without the test and branch penalties. Accordingly, the processor based nested form polynomial engine 100 consumes a minimum number of cycles with a minimum amount of code via the concise instruction format. However, those skilled in the art will recognize that the processor based nested form polynomial engine for evaluating fixed point polynomials according to an embodiment of the present invention may be implemented in software, hardware or a combination thereof.

Figure 3:
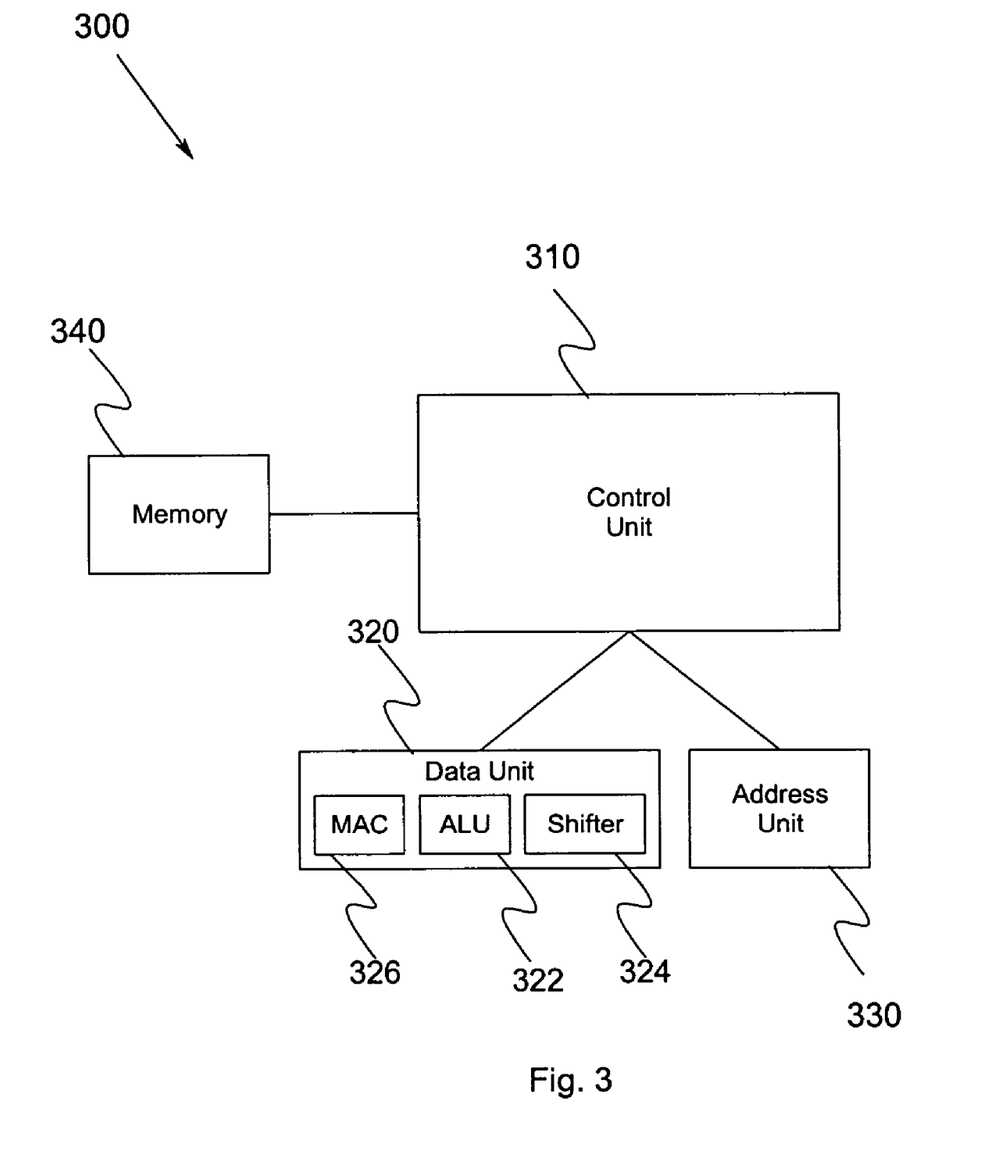
FIG. 3 illustrates a block diagram of a digital signal processing circuit for implementing an arithmetic shifter and saturation detection circuit according to an embodiment of the present invention.

FIG. 3 illustrates a block diagram of a digital signal processing circuit 300 for implementing an arithmetic shifter and saturation detection circuit according to an embodiment of the present invention. FIG. 3 shows a control unit 310, a data unit 320 and an address unit 330. The control unit 310 directs the operation of the digital signal processor based on an instruction set (ISA) optimised for the task of rapid signal processing. The signal processing is divided between the control unit 310 that directs program flow and one or more execution units that perform operations on data. Almost always, a collection of registers/memory 340 is included to hold operands and intermediate results. One of the execution units is the address unit 330. The address unit 330, AU, directs the operand fetch for all variables which are defined and used by the executing instructions or program. Another execution unit is the data unit 320, which includes at least one arithmetic logic unit 322, shifter 324 and multiplier-accumulator (MAC) 326. The data unit 320 accepts as inputs the data to be operated on and a code from the control unit 310 indicating what operation to perform. The ALU 322 takes as inputs, the data to be operated on and a code from the control unit indicating which operation to perform, and for output provides the result of the computation. The shifter 324 performs logical and arithmetic shifts, bitmanipulation, and other operations on input operands. The MAC 326 implements the processor based nested form polynomial engine according to an embodiment of the present invention and evaluates fixed-point polynomials by using the nested loop form without the normal test and branch penalties. The MAC 326 performs multiply/add and multiply/subtract operations on the input operands and stores the result in the specified result register.

Figure 4:
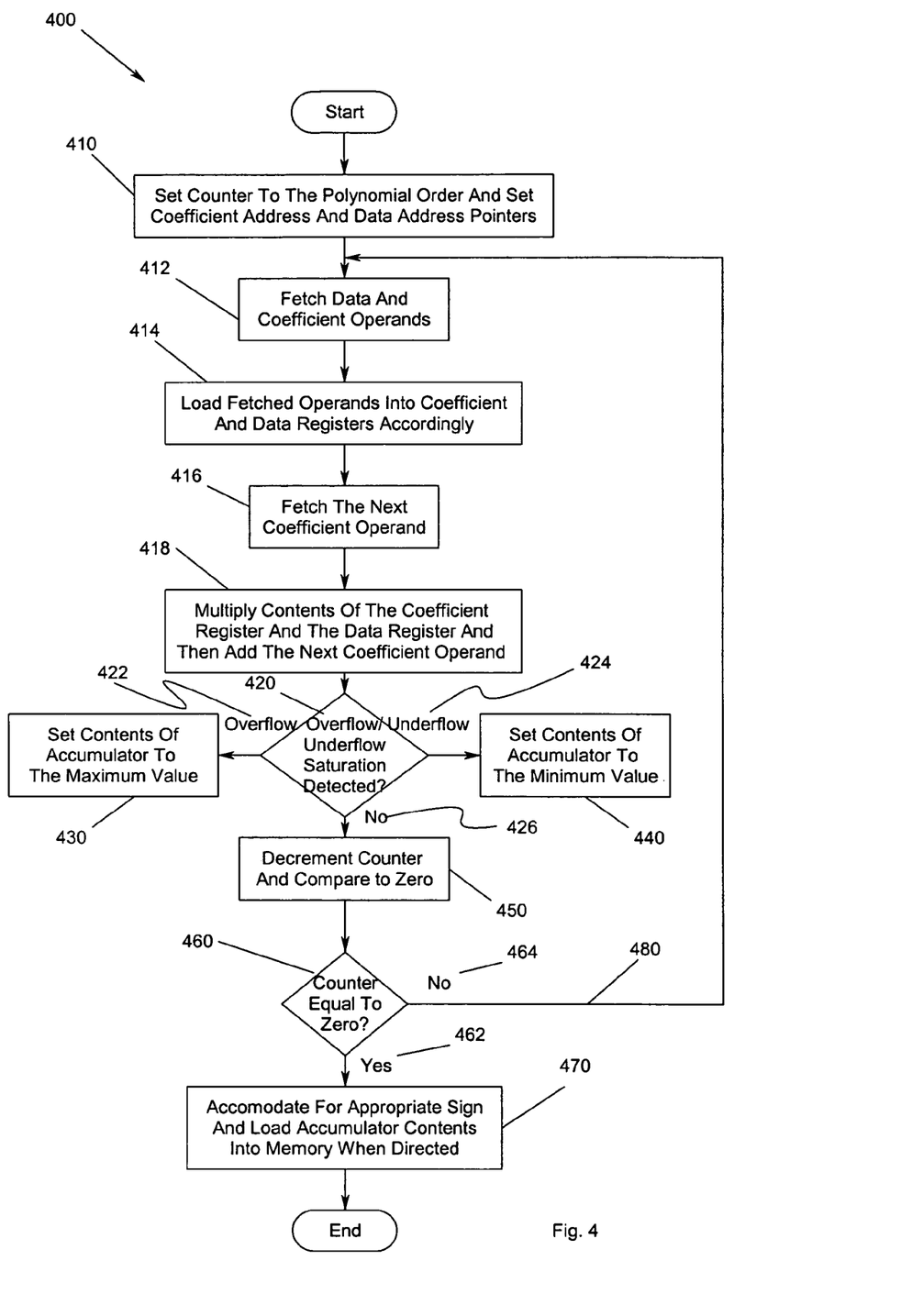
FIG. 4 is a flow chart of the method for evaluating fixed-point polynomials using a processor based nested form polynomial engine according to an embodiment of the present invention.

FIG. 4 is a flow chart 400 of the method for evaluating fixed-point polynomials using a processor based nested form polynomial engine according to an embodiment of the present invention. First, a counter is set to the polynomial order, the coefficient pointer is set to the coefficient address and the data pointer is set to the data address 410. The coefficient and data operands are fetched 412. The sign is the most significant bit of the data. The fetched operands are loaded into the coefficient and data registers as appropriate 414. The data value used is x, or |x| if Ab=1. The next coefficient is fetched 416. Then, the contents of the coefficient register and the data register are multiplied and the next coefficient and that was fetched is added to the product 418. A determination is made whether overflow/underflow is detected 420. If overflow is detected 422, the content of the accumulator is set to the maximum value 430. If underflow is detected 424, the content of the accumulator is set to the minimum value 440. The counter is decremented and compared to zero to determine whether the evaluation is completed 450. A determination if made whether the counter is equal to zero 460. If yes 462, the evaluation is complete, the appropriate sign is accommodated and the accumulator contents is loaded into memory when directed 470. For example, if Ab is set to 1, the two's compliment of the contents of the accumulator is provided if the sign of the data was negative. If Up is set to 1, the contents of the accumulator are stored in the SRAM at an address specified by an address pointer register. If no, 463, the process recycles to include the next operands 480.

Figure 5:
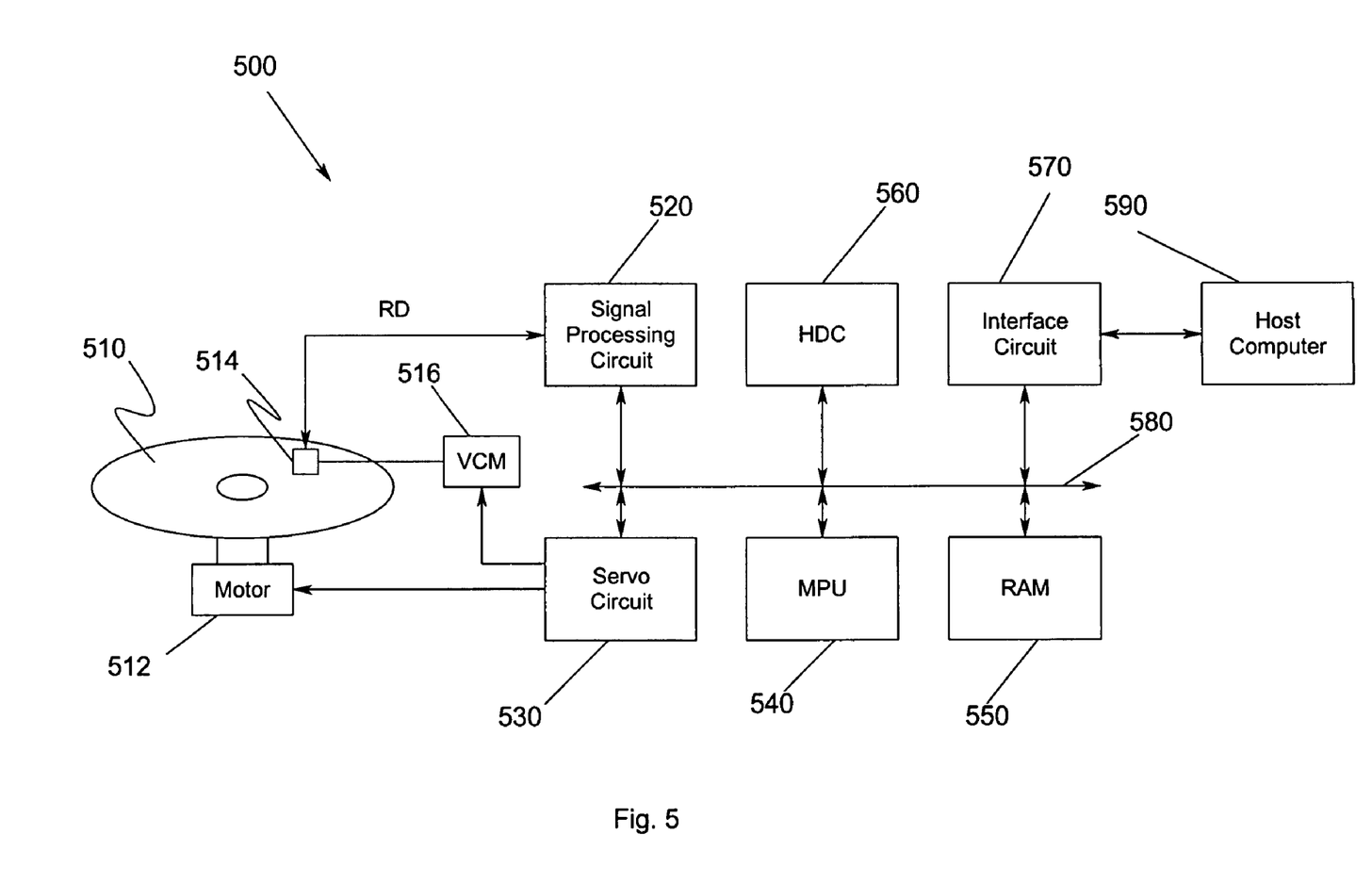
FIG. 5 shows a schematic block diagram showing a hard disk storage system according to one embodiment of the present invention.

FIG. 5 shows a schematic block diagram showing a hard disk storage system 500 according to one embodiment of the present invention. The hard disk storage system 500 is connected to a host computer 590. The hard disk storage system 500 responds to the write request by the host computer 590 and records the recording data from the host computer 590 on a magnetic disk 510, which serves as a recording medium. The hard disk storage system 500 further responds to the read request from the host computer 590, reads the data recorded on the magnetic disk 510, and sends the data to the host computer 590. The hard disk storage system 500 includes the magnetic disk 510, first and second motors 512, 516, a head device 514, a signal processing circuit 520, a servo circuit 530, a microprocessor (MPU) 540, a memory (RAM) 550, a hard drive controller (HDC) 560, and an interface circuit 570. The circuits 520-570 are connected to one another by a bus 580.

The magnetic disk 510 is rotated by the first motor 512 at a constant rotating speed. The second motor 516 controls the head device 514 so that it moves in the radial direction with respect to the magnetic disk 510. The head device 514 reads the data recorded on the magnetic disk 510 and sends a read signal, RD, to the signal processing circuit 520.

The signal processing circuit 520 samples the read signal, RD, in synchronism with a clock signal and generates a digital read signal. The signal processing circuit 520 carries out a decoding process on the digital read signal and outputs the decoded data signal. The servo circuit 530 controls the first motor 512 and rotates the magnetic disk 510 at a constant speed. The servo circuit 530 further receives the decoded data signal from the signal processing circuit 520 via the bus 580 and controls the second motor 516 based on the servo data included in the digital read signal so that the head device 514 is on track at the target position.

The MPU 540 analyzes the write/read processing command sent from the host computer 590 in accordance with the program data stored in the RAM 550 and sends a control signal to the HDC 560 via the bus 580. The HDC 560 controls the signal processing circuit 520 and the servo circuit 530 in accordance with the control signal from the MPU 540. The HDC 560 further receives a data signal from the signal processing circuit 520 via the bus 580. The HDC 560 processes date, e.g., performs an error correcting code (ECC) process on the data signal. The HDC 560 then sends the processed data to the interface circuit 570 via the bus 580. The interface circuit 570 converts the data from the HDC 560 to a predetermined communication mode and sends the converted data to the host computer 590. The MPU 540 includes multiplier-accumulator as illustrated in FIG. 1 for providing a processor based nested form polynomial engine according to an embodiment of the present invention. A concise instruction format is used to significantly decrease the amount of memory required and allow for instruction pipelining without branch penalty. The use of the nested form for evaluating polynomials allows the MPU 540 to evaluate fixed-point polynomials with a minimum amount of code via the concise instruction format and without the test and branch penalties normally associated with traditional loop form polynomial evaluations. The MPU 540 may also be configured so that the processor based nested form polynomial engine may be run by firmware of the HDC 560.

It should be appreciated that the MPU 540 could include a standalone processor or an embedded processor, e.g., the MPU 540 could be embedded in the HDC 560. The MPU 540 could be part of a system on a chip (SOC). Further, the MPU 540 could be an ASIC, which would be hardware circuits that perform the function of the processor operating pursuant to memory 550. In such a situation, memory 550 may be used but is not required, as the ASIC is designed to perform any assigned functions. It should also be appreciated that memory 550 could be either volatile or non-volatile memory. The MPU 540 controls the operation of the voice coil motor 516 and spindle motor 512 via the servo unit 530.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for evaluating polynomials using a processor based nested form polynomial engine, comprising:
   a) setting M to an order of a polynomial to be evaluated;
   b) setting N equal to 1;
   c) receiving an $N^{th}$ coefficient from a memory into a coefficient register;
   d) loading a data operand from the memory into a data register;
   e) providing the $N^{th}$ coefficient and the data operand directly from the coefficient register and data register, respectively, to a multiplier;
   f) multiplying the directly provided $N^{th}$ coefficient and the data operand to produce a product;
   g) providing an $(N+1)^{th}$ coefficient from the memory to an adder;
   h) transferring the product directly to an adder in a next cycle for adding the product to the $(N+1)^{th}$ coefficient to produce a sum;
   i) setting N to equal N+1 and M=M−1;
   j) providing the sum directly to an accumulator and set to an accumulated value;
   k) determining whether M is less than 1;
   l) providing the accumulated value to the coefficient register as an $N^{th}$ coefficient when M is not less than 1;
   m) returning to step e) when M is not less than 1;
   n) providing the accumulated value as a result when the M is less than 1 thereby indicating evaluation of the polynomial is complete; and
   o) providing the result to a circuit for transformation into a control operation for controlling a function of the circuit.

2. The method of claim 1 further comprising processing the accumulated value of the accumulator so that the sign of the accumulated value of the accumulator and the sign of the data are the same.

3. The method of claim 2 further comprising loading the accumulated value of the accumulator into memory when directed.

4. The method of claim 3, wherein the loading the accumulated value of the accumulator into memory when directed further comprises storing the accumulated value of the accumulator into a memory location specified by an address data register.

5. The method of claim 1, wherein the completing the evaluation further comprises loading the accumulated value of the accumulator into memory when directed.

6. The method of claim 5, wherein the loading the contents of the accumulator into memory when directed further comprises storing the accumulated value of the accumulator into a memory location specified by an address data register.

7. The method of claim 1 further comprising determining whether underflow or overflow is detected after multiplying the $M^{th}$ coefficient and the data operand from the data register to produce a product, setting the accumulated value of the accumulator to a maximum value when an overflow is detected and setting the accumulated value of the accumulator to a minimum value when an underflow is detected.

8. A processor based nested form polynomial engine, comprising:
   memory for providing a counter have a value M set to an order of the polynomial to be evaluated for determining when evaluation of a polynomial is complete, a coefficient address pointers register for maintaining a coefficient address pointer having an initial value of N set to 1, and a data address pointers register for maintaining a data address pointer;
   a coefficient register, coupled to the memory, for receiving an $N^{th}$ coefficient from a memory into a coefficient register;
   a data register, coupled to the memory, for loading a data operand identified by the data address pointer;
   a multiplier, coupled directly to the coefficient register and data register, for receiving the $N^{th}$ coefficient and the data operand directly from the coefficient register and data register, respectively and for multiplying the directly provided $N^{th}$ coefficient and the data operand to produce a product;
   an adder, coupled directly to the multiplier, for receiving an $(N+1)^{th}$ coefficient from the memory and for receiving the product directly to an adder in a next cycle for adding the product to the $(N+1)^{th}$ coefficient to produce a sum, wherein, thereafter, N is set to equal N+1 and M is set to equal M-1;
   an accumulator, coupled directly to the adder, for receiving the sum directly from the adder, wherein the sum received by the accumulator is set to an accumulated value;
   a state machine, coupled to the memory, for determining whether M is less than 1, the state machine directing the accumulator to provide the accumulated value to the coefficient register as an $N^{th}$ coefficient when M is not less than 1 and returning operation to the multiplier when M is not less than 1, wherein the state machine directs the accumulator to provide the accumulated value as a result when the M is less than 1 thereby indicating evaluation of the polynomial is complete and to provide the result to a circuit for transformation into a control operation for controlling a function of the circuit.

9. The processor based nested form polynomial engine of claim 8, wherein the state machine processes the accumulated value so that the sign of the accumulated value and the sign of the data are the same.

10. The processor based nested form polynomial engine of claim 8, wherein the state machine loads the accumulated value into an address of the memory when directed.

11. The processor based nested form polynomial engine of claim 10, wherein the state machine determines whether underflow or overflow of the accumulator is detected, sets the accumulated value of the accumulator to a maximum value when an overflow is detected and sets the accumulated value to a minimum value when an underflow is detected.

12. A processor unit, comprising:
   memory for storing data and instructions therein; and
   a processor configured for performing evaluation of a polynomial using a nested form, the processor being configured to a) set M to an order of a polynomial to be evaluated, b) set N equal to 1, c) receive an $N^{th}$ coefficient from a memory into a coefficient register, d) load a data operand from the memory into a data register, e) providing the $N^{th}$ coefficient and the data operand directly from the coefficient register and data register, respectively, to a multiplier, f) multiply the directly provided $N^{th}$ coefficient and the data operand to produce a product, g) provide an $(N+1)^{th}$ coefficient from the memory to an adder, h) transfer the product directly to an adder in a next cycle for adding the product to the $(N+1)^{th}$ coefficient to produce a sum, i) set N to equal N+1 and M=M-1, j) provide the sum directly to an accumulator and set to an accumulated value, k) determine whether M is less than 1, l) provide the accumulated value to the coefficient register as an $N^{th}$ coefficient when M is not less than 1, m) return to e) when M is not less than 1, n) provide the accumulated value as a result when the M is less than 1 thereby indicating evaluation of the polynomial is complete, and o) provide the result to a circuit for transformation into a control operation for controlling a function of the circuit.

13. The processor unit of claim 12, wherein the processor further processes the accumulated value of the accumulator so that the sign of the accumulated value of the accumulator and the sign of the data are the same.

14. The processor unit of claim 12, wherein the processor further loads the accumulated value of the accumulator into memory when directed.

15. The processor unit of claim 14, wherein the processor loads accumulated value of the accumulator into a memory location specified by an address data register.

16. The processor unit of claim 12, wherein the processor determines whether underflow or overflow is detected after multiplying the $N^{th}$ coefficient from the coefficient register and the data operand from the data register to produce a product, sets the accumulated value of the accumulator to a maximum value when an overflow is detected and sets the accumulated value of the accumulator to a minimum value when an underflow is detected.

17. A data storage system, comprising:
   a translatable recording medium for storing data thereon;
   a motor for translating the recording medium;
   a transducer disposed proximate the recording medium for reading and writing data on the recording medium;
   an actuator, coupled to the transducer, for moving the transducer relative to the recording medium; and
   a storage control device for controlling operation of the data storage system, the storage control device further comprising:
      a storage controller for processing read and write signals; and
      a processor unit, coupled to the storage controller, the processor unit performing evaluation of a polynomial using a nested form, the processor being configured to a) set M to an order of a polynomial to be evaluated, b) set N equal to 1, c) receive an $N^{th}$ coefficient from a memory into a coefficient register, d) load a data operand from the memory into a data register, e) providing the $N^{th}$ coefficient and the data operand directly from the coefficient register and data register, respectively, to a multiplier, f) multiply the directly provided $N^{th}$ coefficient and the data operand to produce a product, g) provide an $(N+1)^{th}$ coefficient from the memory to an adder, h) transfer the product directly to an adder in a next cycle for adding the product to the $(N+1)^{th}$ coefficient to produce a sum, i) set N to equal N+1 and M=M−1, j) provide the sum directly to an accumulator and set to an accumulated value, k) determine whether M is less than 1, l) provide the accumulated value to the coefficient register as an $N^{th}$ coefficient when M is not less than 1, m) return to e) when M is not less than 1, n) provide the accumulated value as a result when the M is less than 1 thereby indicating evaluation of the polynomial is complete, and o) provide the result to a circuit for transformation into a control operation for controlling a function of the circuit.

18. The storage control device of claim 17, wherein the processor further processes the accumulated value of the accumulator so that the sign of the accumulated value of the accumulator and the sign of the data are the same.

19. The storage control device of claim 17, wherein the processor further loads the accumulated value of the accumulator into memory when directed.

20. The storage control device of claim 19, wherein the processor loads content of the accumulator into a memory location specified by an address data register.

21. The storage control device of claim 17, wherein the processor determines whether underflow or overflow is detected after multiplying the $N^{th}$ coefficient from the coefficient register and the data operand from the data register to produce a product, sets the accumulated value of the accumulator to a maximum value when an overflow is detected and sets the accumulated value of the accumulator to a minimum value when an underflow is detected.

22. A processor unit, comprising:

means for providing a counter have a value M set to an order of the polynomial to be evaluated for determining when evaluation of a polynomial is complete, a coefficient address pointers register for maintaining a coefficient address pointer having an initial value of N set to 1, and a data address pointers register for maintaining a data address pointer;

means for receiving an $N^{th}$ coefficient from the means for providing a counter into a coefficient register;

means for loading a data operand from the means for providing a counter into a data register;

means for receiving the $N^{th}$ coefficient and the data operand directly from the means for receiving an $N^{th}$ coefficient and means for loading a data operand, respectively, and for multiplying the directly provided $N^{th}$ coefficient and the data operand to produce a product;

means for receiving an $(N+1)^{th}$ coefficient from the means for providing a counter and for adding the product to the $(N+1)^{th}$ coefficient to produce a sum;

means for setting N to equal N+1 and M=M−1;

means for receiving the sum for accumulation directly from the means for receiving and for adding, the sum being set to an accumulated value; and means, coupled to the memory, for determining whether M is less than 1, for directing the means for receiving the sum for accumulation to provide the accumulated value to the means for receiving an $N^{th}$ coefficient as an $N^{th}$ coefficient when M is not less than 1 and returning operation to the means for multiplying when M is not less than 1, wherein the means for directing directs the means for receiving the sum for accumulation to provide the accumulated value as a result when the M is less than 1 thereby indicating evaluation of the polynomial is complete and to provide the result to a circuit for transformation into a control operation for controlling a function of the circuit.

* * * * *